UNITED STATES PATENT OFFICE.

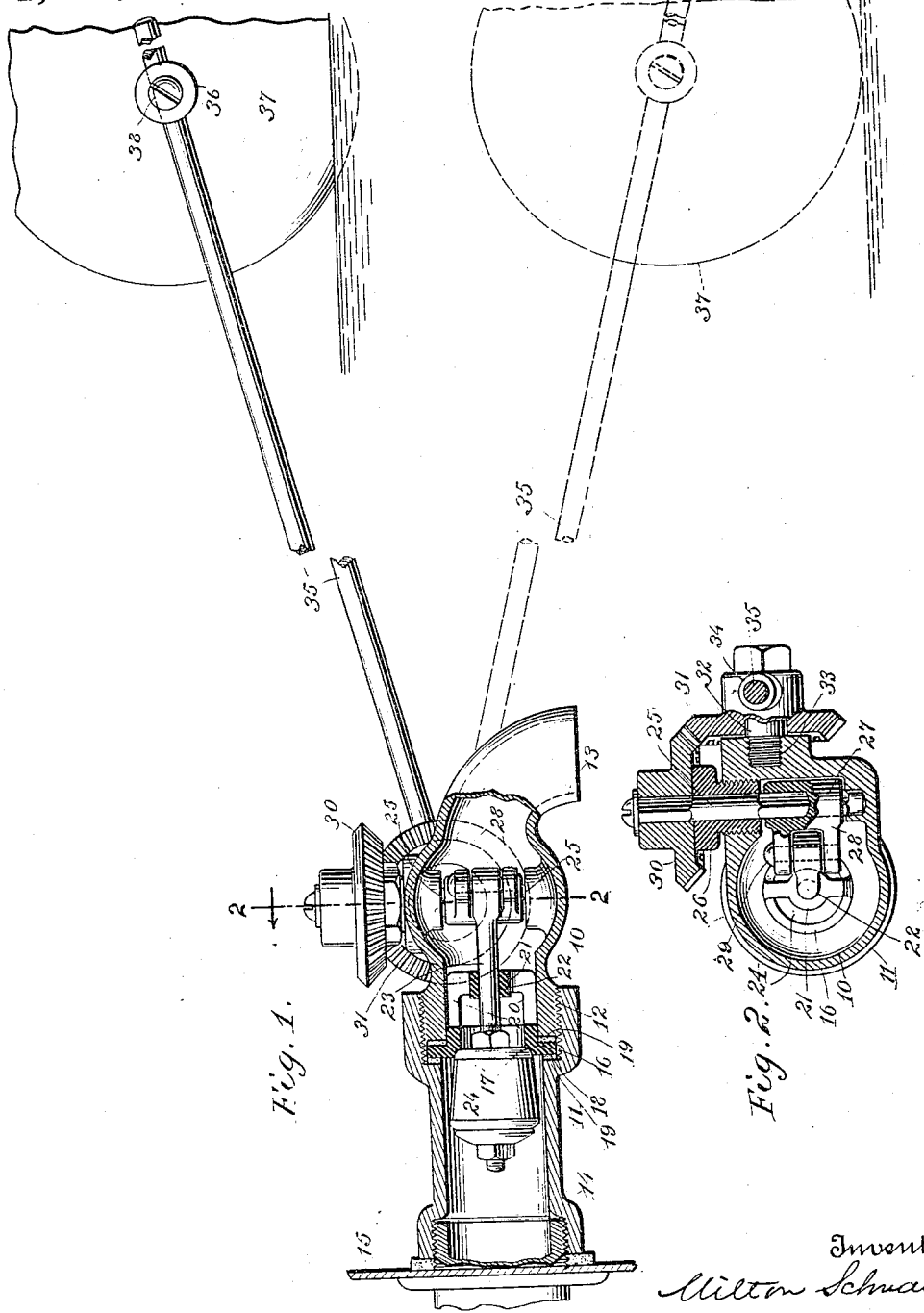

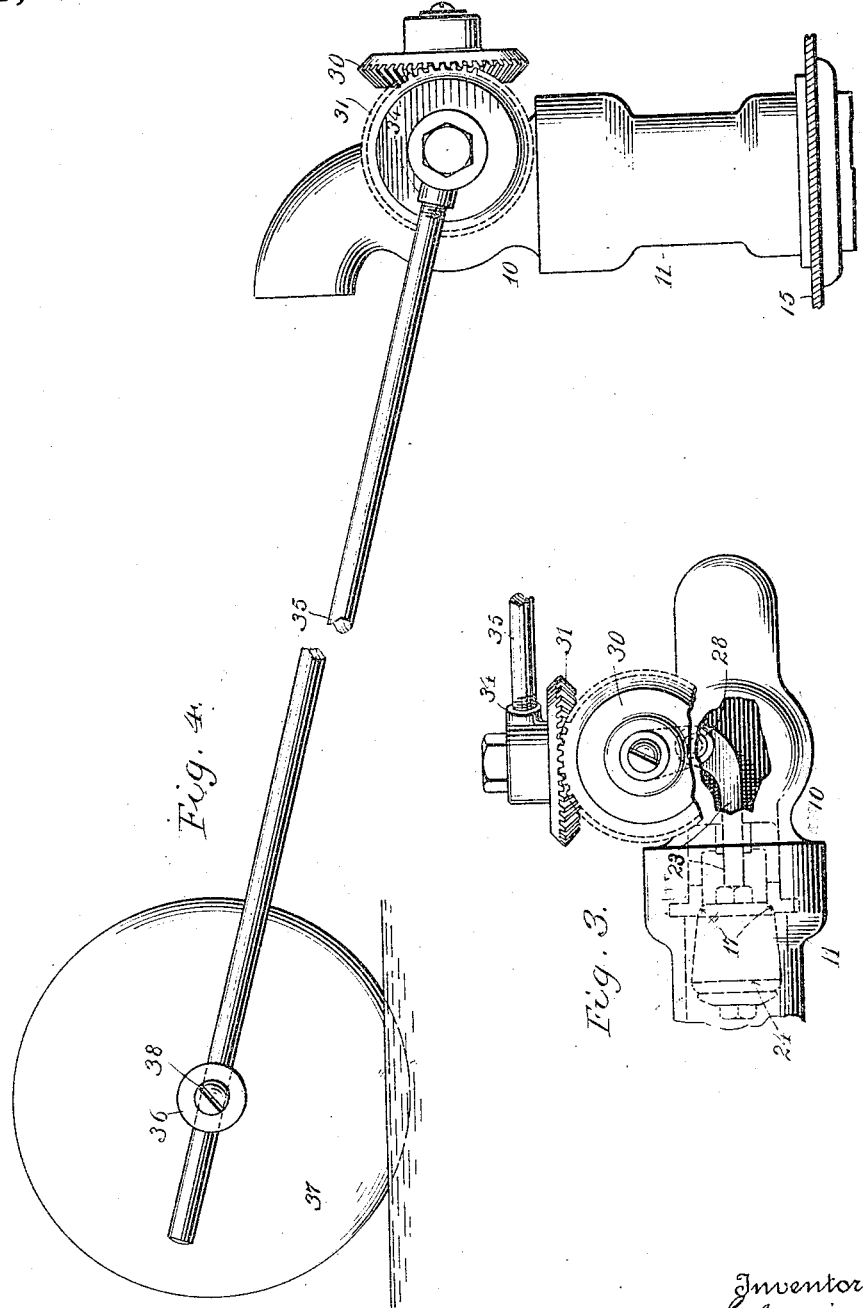

MILTON SCHNAIER, OF NEW YORK, N. Y.

FLOAT-VALVE.

1,285,570.

Specification of Letters Patent.  Patented Nov. 19, 1918.

Application filed May 23, 1917. Serial No. 170,368.

*To all whom it may concern:*

Be it known that I, MILTON SCHNAIER, a citizen of the United States, residing at the city of New York, borough of Manhattan, in the county and State of New York, have invented certain new and useful Improvements in Float-Valves, of which the following is a full, clear, and exact specification.

This invention relates to improvements in float valves and the same has for its object to provide a valve of this type which is simple in construction and efficient and reliable in operation.

Further, the invention has for its object to provide a valve of this type in which the pressure of the water tends to hold the valve member upon its valve seat.

Further, the invention has for its object to provide a valve of this type comprising a valve casing and a member removably positioned therein, provided with a valve seat and means for supporting and guiding the valve stem.

Further, the invention has for its object to provide a valve of this type adapted to be mounted either upon one of the vertical walls of the tank or upon the bottom thereof.

Further, the invention has for its object to provide a valve of this type in which the position of the float-carrying rod relative to the valve casing may be varied to permit the valve to be used with the valve casing either in a horizontal or a vertical position.

To the attainment of the aforesaid objects and ends my invention consists in the novel details of construction, and in the combination, connection and arrangement of parts hereinafter more fully described and then pointed out in the claims.

In the accompanying drawings showing an illustrative embodiment of the invention, Figure 1 is a longitudinal sectional view of a valve constructed according to and embodying the invention, the valve being shown supported upon one of the vertical walls of a tank;

Fig. 2 is a sectional view thereof taken substantially on the line 2—2 of Fig. 1;

Fig. 3 is a plan or top view of the valve, part being broken away, and

Fig. 4 is a side elevational view showing the valve supported upon the bottom of the tank.

Referring to the drawings the valve casing comprises two sections 10 and 11 having co-acting threads 12 formed upon their inner ends whereby they are detachably secured to one another. The outer end of the section 10, which is preferably curved as shown, is provided with an outlet opening 13 and the section 11 is provided at its outer end with an inlet opening 14 adapted to communicate with a pipe leading from a suitable source of water supply.

As shown in Figs. 1, 2 and 3 the valve casing 10, 11, is secured to a vertical wall 15 of a tank in any desired manner.

Positioned within the valve casing 10, 11, and fitting snugly within the inner end of the section 10 thereof, is a removable annular member 16 having a valve seat 17 formed therein and provided with an outwardly extending flange 18 adapted to be clamped between the inner ends of the sections 10 and 11 of the valve casing when the sections are assembled, in order to hold the annular member 16 firmly in position within the casing. Washers 19 are preferably placed upon either side of the flange 18. Extending forwardly from the annular member 16 are arms 20, the forward ends of which are connected to one another by a cross bar 21 having a centrally positioned perforation 22 formed therein. The arms 20 and cross bar 21 constitute a support and guide for a valve stem 23 passing through the perforation 22 and having a valve member 24 adjustably mounted upon its rear end and adapted to coact with the valve seat 17 formed in the annular member 16.

Rotatably mounted upon the section 10 of the valve casing 10, 11, is a shaft 25 having its inner end journaled in the wall of the casing and its outer end journaled in and extending through a bushing 26. Secured to the shaft 25, and positioned within the valve casing 10, 11, is a sleeve 27 provided with laterally extending, spaced lugs 28 between which the outer end of the valve stem 23 is received. A pin 29 passing through registering perforations formed in the lugs 28 and the outer end of the valve stem 23 provides a pivotal connection between the valve stem 23 and the sleeve 27.

Secured to the outwardly extending end of the shaft 25 is a bevel gear 30 meshing with a bevel gear 31 rotatably supported upon a stud 32, having its inner end threaded and engaging a threaded recess 33 in the wall of the valve casing.

Extending laterally from the hub of the bevel gear 31 is a lug 34 provided with a threaded recess to receive the threaded end of a rod 35, the other end of which extends within a socket 36 carried by a float 37. The float is firmly secured to the rod 35 by a set screw 38 passing through the wall of the socket 36 and engaging the rod 35.

The operation of the valve, which should be largely obvious from the description, is as follows:—

Assuming the tank to be filled with water, the float 37 will be in its raised position, as shown in full lines in Fig. 1, and the valve member 24 will be held against the valve seat 17, as shown in said figure, thereby shutting off the flow of water through the valve casing. If the water is allowed to flow from the tank, the float 37 will fall, as the water level within the tank falls, until the tank is emptied, at which time the float 37 will assume the position indicated by dotted lines in Fig. 1.

During this movement of the float 37 the bevel gear 31, to which the rod 35 is secured, will be rotated in a clockwise direction, as seen in Fig. 1, and the bevel gear 30 and the shaft 25 to which it is secured, will thereupon be rotated in a direction to cause the valve member 24 to be moved away from its seat 17 and against the flow of the water, which is then permitted to pass through the valve casing 10, 11, and into the tank. As the water flows into the tank, the float 37 will rise as the water level within the tank rises, and the bevel gear 31 and bevel gear 30 and shaft 25 will thereupon be rotated in reverse directions to that above described, thereby causing the valve member 24 to be moved toward the valve seat 17 with which it will engage when the float 37 reaches its highest position owing to the tank being filled with water. As the water flows through the valve casing 10, 11, in the direction of the movement of the valve member 24 as it approaches the valve seat 17, the pressure of the water will assist, instead of retarding, the closing movement thereof. When the valve member 24 is fully closed, the pressure of the water will hold it pressed firmly upon the valve seat 17 thereby insuring that there will be no leakage of water through the valve casing and preventing accidental displacement of the valve member 24 from the valve seat 17. The throw or movement of the valve member 24 may be varied to permit more or less water to flow into the tank by varying its position relatively to the valve stem 23 upon which it is adjustably mounted.

As shown in Fig. 1 the valve casing 10, 11, is supported upon one of the vertical walls of the tank. Should it be desired to mount the valve casing 10, 11, upon the bottom of the tank, as is sometimes done, it is of course necessary that the rod 35 carrying the float 37 occupy a position relative to the valve casing 10, 11, substantially at right angles to the position it occupies when the valve casing 10, 11, is supported upon the vertical wall of the tank. This change in the position of the rod 35 relative to the valve casing 10, 11, is readily accomplished by simply unscrewing the stud 32 sufficiently to permit the bevel gear 31 to be moved outwardly from the valve casing and out of mesh with the bevel gear 30. The bevel gear 31 is then rotated about the stud 32 through an angle of ninety degrees whereupon it is moved inwardly with respect to the casing and into mesh with the bevel gear 30, after which the stud 32 is again screwed into the recess 33 to hold the bevel gear 31 in its adjusted position.

The positions of the bevel gear 31, rod 35 and float 37, relatively to the valve casing 10, 11 when the latter is mounted upon the bottom of the tank, are clearly shown in Fig. 4. The operation of the apparatus when the valve casing is thus mounted within the tank is the same as that hereinabove described.

In either position of the valve casing the up and down movement or travel of the float 37 may be varied to adapt the apparatus for use in connection with tanks of different depths, by varying the position of the gear wheel 31 relatively to the gear wheel 30, and also by varying the position of the valve member 24 relatively to the valve stem 23.

Having thus described my said invention what I claim and desire to secure by Letters Patent is:—

1. A valve of the character described, comprising a valve casing, a valve seat therein, a valve member operatively associated with said valve seat and movable with respect thereto, actuating means operatively connected to said valve member and comprising a pair of interengaging members, one of said members being movable out of engagement with the other thereof whereby it may be adjusted with respect thereto to adapt the valve to different walls of a receptacle, and actuating means operatively connected to said adjustable member, substantially as specified.

2. A valve of the character described, comprising a valve casing, a valve seat therein, a valve member operatively associated with said valve seat and movable with respect thereto, actuating means operatively connected to said valve member and comprising a pair of interengaging members, one of said members being movable out of engagement with the other thereof whereby it may be adjusted with respect thereto to adapt the valve to different walls of a receptacle, and a float operatively connected to said adjustable member, substantially as specified.

3. A valve of the character described, comprising a valve casing, a valve seat therein, a valve member operatively associated with said valve seat and movable with respect thereto, actuating means operatively connected to said valve member and comprising a pair of intermeshing gear wheels, one of said gear wheels being movable out of mesh with the other of said gear wheels whereby it may be adjusted with respect thereto, and actuating means operatively connected to said adjustable gear wheel, substantially as specified.

4. A valve of the character described, comprising a valve casing, a valve seat therein, a valve member operatively associated with said valve seat and movable with respect thereto, actuating means operatively connected to said valve member and comprising a pair of intermeshing gear wheels, one of said gear wheels being movable out of mesh with the other of said gear wheels whereby it may be adjusted with respect thereto, and a float operatively connected to said adjustable gear wheel, substantially as specified.

5. A valve of the character described, comprising a valve casing, a valve seat therein, a valve member operatively associated with said valve seat and movable with respect thereto, actuating means operatively connected to said valve member and comprising a pair of intermeshing gear wheels, supporting means carried by said casing and upon which one of said gear wheels is mounted, said gear wheel being movable out of mesh with the other of said gear wheels and adjustable with respect thereto while mounted upon said supporting means, and a float operatively connected to said adjustable gear wheel, substantially as specified.

6. A valve of the character described, comprising a valve casing, a valve seat therein, a valve member operatively associated with said valve seat and movable with respect thereto, a shaft rotatably mounted upon said casing and operatively connected to said valve member, a gear wheel secured to said shaft, a second gear wheel meshing with said first mentioned gear wheel, supporting means carried by said casing and upon which said second mentioned gear wheel is rotatably mounted, said supporting means being movable with respect to said casing whereby said second mentioned gear may be moved out of mesh with said first mentioned gear wheel and adjusted with respect thereto, and a float operatively connected to said second mentioned gear wheel, substantially as specified.

Signed at the city of New York, in the county and State of New York, this 8th day of May, one thousand nine hundred and seventeen.

MILTON SCHNAIER.

Witnesses:
CONRAD A. DIETERICH,
WILLIAM P. JONES.

Copies of this patent may be obtained for five cents each, by addressing the "Commissioner of Patents, Washington, D. C."